April 15, 1930.  S. C. IGOU  1,754,953
TRANSMISSION
Filed March 1, 1926  2 Sheets-Sheet 1
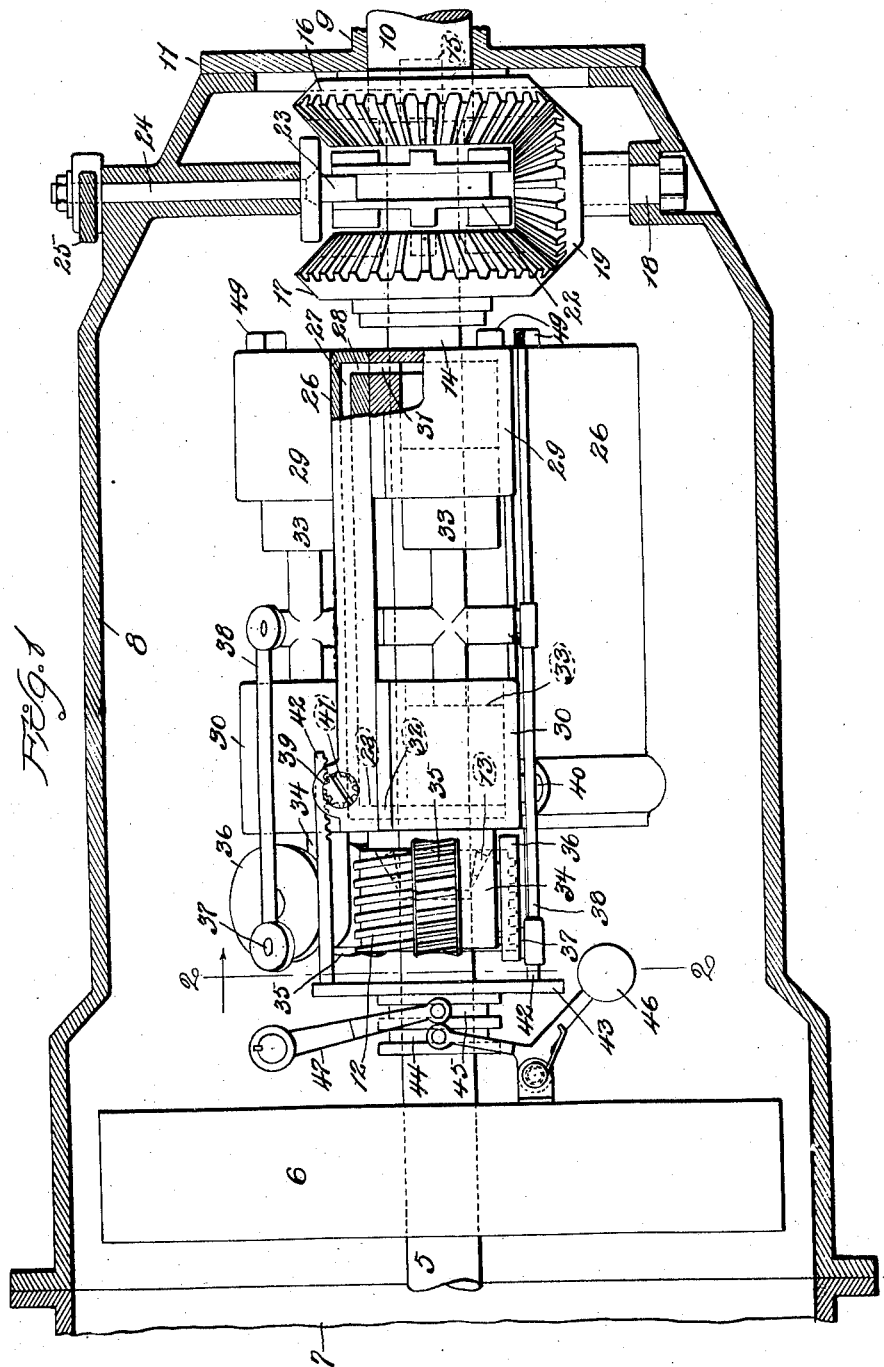
INVENTOR
SAMUEL C. IGOU,
by Eiler & Schamberg, ATTORNEYS.

April 15, 1930.  S. C. IGOU  1,754,953
TRANSMISSION
Filed March 1, 1926    2 Sheets-Sheet 2
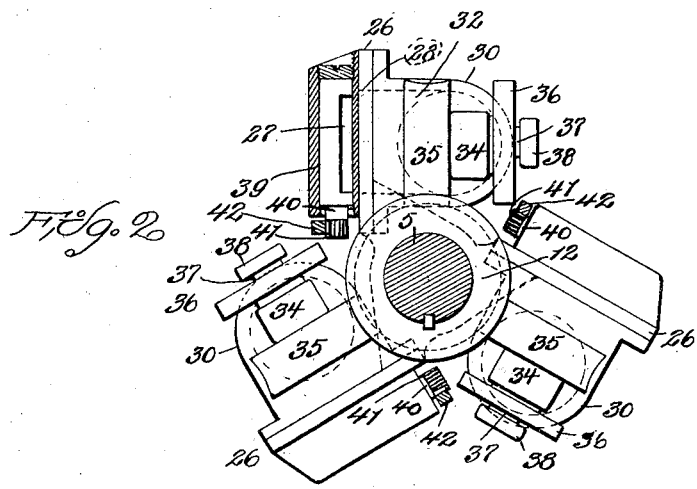
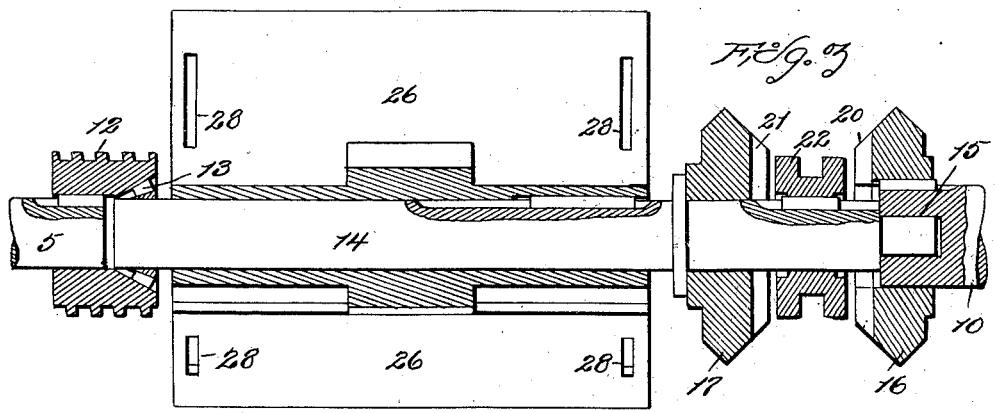
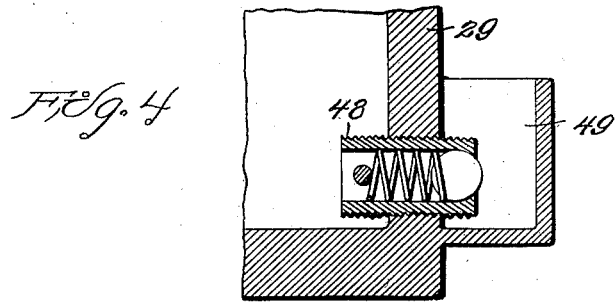
INVENTOR
SAMUEL C. IGOU,
by Eilers & Schaumberg, ATTORNEYS.

Patented Apr. 15, 1930

1,754,953

UNITED STATES PATENT OFFICE

SAMUEL C. IGOU, OF ST. LOUIS, MISSOURI

TRANSMISSION

Application filed March 1, 1926. Serial No. 91,474.

My invention relates to improvements in transmissions, or mechanisms for transmitting the revolutions of a driving shaft to a driven shaft, and is particularly applicable to automobiles employing internal combustion engines whose cranks, or driving shafts, have only unidirectional motion and wherein there is requirement for revolving the driven shaft, either with or reversely of, and at varying speeds relative to the driving shaft.

My improvements belong to the class of transmissions involving positive connections between the driving and driven shafts in which is included an intermediate shaft which may be driven or idled, relative to the driving shaft, by fluid controlled means and reversibly related to the driven shaft.

My object is to provide a transmission consisting of a worm, connected to rotate with a driving shaft; a device, comprising a worm wheel having planetary relation to the worm; a dash-pot involving controlled ports for the control of the planetary motion of the gear wheel; a means for actuating the control means of said ports; and a reversible drive connection between said device and a driven shaft, whereby the speed and direction of the driven shaft may be governed with facility, and in a noiseless manner.

A further object is to provide a transmission comprising means for automatically varying the speed of rotation of the driven shaft relative to the driving shaft.

To the above purposes my improvements consist in the novel construction, arrangement and combination of parts, as hereinafter fully, clearly and concisely described, definitely pointed out in my claims and illustrated by the accompanying drawings, in which:—

Fig. 1 is a plan view of a transmission, constructed in accordance with my invention, having certain parts broken away and in section;

Fig. 2 is a transverse, sectional elevation taken on the line 2—2 of Fig. 1;

Fig. 3 is a longitudinal, sectional elevation showing the relation of the driving, intermediary and driven shafts; and Fig. 4 is an enlarged, sectional detail showing the means for preserving uniformity in the fluid content of the dash-pots.

Referring by numerals to the drawings, 5 designates the driving shaft; 6 a fly-wheel thereon; and 7 the engine casing; all of which are, or may be of conventional, automobile-engine design.

The numeral 8 designates my transmission casing which is in open communication with the engine casing 7, and which has a bearing 9, for a driven shaft 10, and a fluid-tight head 11.

As best shown in Fig. 3, there is keyed to the end of the driving shaft 5, a worm 12, in which a bearing 13 is provided for the support of one end of the transmission, or intermediate, shaft 14, whose other end is supported in a bearing 15, at the end of the driven shaft 10.

Keyed to the driven shaft is a bevel gear 16; loosely carried on the transmission shaft 14, is a bevel gear 17, and carried on a stub 18, supported in the casing 8, is a bevel gear 19, in constant mesh relation with the bevel gears 16 and 17. The adjacent faces of the bevel gears 16 and 17 are provided with clutch elements 20 and 21, respectively, and key-related to the transmission shaft 14, is a clutch 22, resident between the bevel gears 16 and 17.

For the movement of the clutch, I provide a cam 23, carried on a stem 24, projected through the transmission casing, and a manipulative lever 25.

Supported upon, and keyed to, the transmission shaft 14, is a spider comprising radially disposed plates 26, in each of which plates is a continuous channel 27 whose ends open through the plates to constitute portholes 28, 28 adjacent each end of each plate.

Carried by each plate is a pair of relatively opposed dash-pots 29, and 30, which are substantially identical and each provided with cylinder ports 31 and 32, for constant communication with the port-holes 28, 28, in said plates 26.

For operation in each pair of dash-pots, there are the balanced pistons 33.

Each of the dash-pots 30 is provided with a bearing 34, which projects over the worm 12, and each carries a worm-wheel 35, for mesh with the worm 12, carried on the driving shaft, and each of said bearings also supports a wheel 36 having a wrist pin 37 which is connected with the stem of the balanced pair of pistons 33, by a pitman 38.

Intersecting each channel 27 and formed in each plate 26, is a bore 39, in which a rotary, cut-off valve is mounted and provided with a stem 40, having gear teeth 41. For the actuation of said valves, I provide a rack-bar 42, carried on a supporting element 43 having sliding relation to the driving shaft and provided with an extension having annular grooves 44 and 45 engageable, respectively, by a centrifugal governor 46, and a manual control 47.

For maintaining uniformity of the fluid content of each surge chamber, which preferably comprises a pair of the dash-pots, the channel 27, and the ports relating to the dash-pots and channel, I provide, for each dash-pot 29, a check-valve 48, as best shown in Fig. 4, in which a spring actuated ball acts to admit fluid, preferably oil, from the casing 8, to the dash-pot and prevents escape of the fluid from the dash-pot to the casing.

Obviously upon an outward movement of the piston from a dash-pot 29, the pressure will be relieved upon the ball of the check valve so that fluid may pass from the casing inwardly through the check valve.

To build up a pressure in the fluid in the casing at the outer end of the check valve, I provide a cup 49, carried by the end of the dash-pot, which partially surrounds the check valve and which has a side open in the direction of the travel of the dash-pot, in which sufficient pressure is produced to admit fluid through the check valve, assuming the dash-pot to be rotated at a relatively high speed.

Assuming the driving shaft 5 and worm 12 to be rotating, and the channels 27 between the dash-pots to be wide open, it will be obvious that the fluid content of the surge chambers will offer no resistance to the movements of the pistons and that the rotation of the worm 12 will impart only rotation of the worm wheels 35, upon their own axis. Upon a restriction of the channels, as by a movement of the valves, through the rack-bars 42 as effected by either the manual or speed controlled means, 47 or 46, the free surging of the balanced pistons is checked with the result that the worm wheels 35, no longer allowed free rotations on their own axis, will, by torque, upon the worm 12, be caused to have planetary movement about the worm 12 and as a consequence rotate the transmission shaft, in the same direction as the driving shaft, which, in the instance shown, is clockwise. With the gear wheel 17, loose upon the transmission shaft, there will be no movement of the driven shaft.

If it be desired to move the driven shaft in the same direction as the transmission shaft, the clutch 22, which is keyed to the transmission shaft, is moved to engage the seats 20 in the bevel gear 16 at which time the bevel gears 17 and 19 idle. And, if it be desired to rotate the driven shaft in a reversed, or opposite direction relative to the transmission shaft, the clutch is thrown to engage the seats 21 in the bevel gear 17, which causes the gear 17 to travel with the clutch and which through bevel gear 19 causes a rotation of the gear 16 and driven shaft 10.

Obviously through the manual control 47, the valves of the transmission may be set to produce infinite speed variation of the transmission shaft from zero (idle) to the speed of the driving shaft, and as a consequence a like variable speed of the driven shaft in either direction.

In the control of the transmission valves by a governor actuated by the driving shaft, there may be effected substantially uniform rotation of the driven shaft at a predetermined speed, for obviously upon added resistance to the rotation of the driven shaft, the speed of the driving shaft will decrease which through the governor will effect a movement of the transmission valves in a direction offering more resistance to the fluid and as a consequence a higher speed of the transmission shaft and driven shaft.

I claim:

1. A transmission comprising a driving shaft, a transmission shaft, a worm rotatable by the driving shaft, a worm wheel rotatable with the transmission shaft and a controllable resistance for the worm wheel.

2. A transmission comprising a driving shaft, a transmission shaft, a driven shaft, a worm rotatable by the driving shaft, a worm wheel rotatable with the transmission shaft, and a controllable hydraulic resistance to axial rotation of the worm wheel, adapted to vary the relative speed of the transmission shaft and driving shaft.

3. A transmission comprising a driving shaft, a transmission shaft, means for causing a variable speed relation between the driving and transmission shafts, said means comprising a worm and a worm gear associated with said shafts, and fluid means tending to oppose rotation of the worm gear, and a governor for controlling said first named means.

4. A transmission comprising a driving shaft, a transmission shaft, means for causing a variable speed relation between the driving and transmission shafts, said means comprising a worm element, and a worm gear element, associated with said shafts, and fluid means controlledly tending to oppose relative rotation of said elements, and a governor for controlling said means, and a manual control for said means capable of nullifying the action of the governor.

5. A transmission comprising a driving shaft, a transmission shaft, a variable speed connection between the driving and transmission shafts comprising a worm rotatable with the driving shaft, a surging chamber, comprising a pair of dash-pots and a communicating channel, rotatable with the transmission shaft, a worm wheel carried by the surging chamber and having planetary relation with said worm, pistons for operation in said dashpots, connections between said pistons and worm wheel, a cut off valve for said channel, and means for actuating said valve.

6. In a fluid transmission, a driving shaft, a driven shaft, a worm, and a worm gear constituting a driving connection between the driving shaft and the driven shaft, and hydraulic means tending to oppose axial rotation of the worm gear and adapted thereby to control the relative speed of said shafts.

7. In a fluid transmission, a driving member, a driven member, a pair of irreversibly, operatively engaged gears having non-parallel axes, each of said gears being operatively associated with one of said members, and a fluid resistance applicable to one of said gears and adapted to control relative movement between the driving member and the driven member of the transmission.

8. In a fluid transmission having axially movable pistons associated with a driven element, a worm gear operatively connected with the pistons, and a worm associated with a driving element and adapted for driving engagement with the worm gear.

SAMUEL C. IGOU.